March 8, 1927.

A. M. KROCZEK

BIRDCAGE

Filed Sept. 11, 1926

1,620,361

Inventor:
A. M. Kroczek
By B. Pelechowicz
Atty.

Patented Mar. 8, 1927.

1,620,361

UNITED STATES PATENT OFFICE.

ANTON M. KROCZEK, OF CHICAGO, ILLINOIS.

BIRDCAGE.

Application filed September 11, 1926. Serial No. 134,793.

This invention relates to bird cages and has for its primary object the provision of locking means between the cage proper and the base thereof.

Another object of the invention is the provision of a bird cage of a very simple construction with means for detachably mounting and joining the cage proper to the base.

Another object of the invention is the provision of a bird cage which relates to the device disclosed in my co-pending application, filed August 1, 1924, Serial Number 729,585, patented Sept. 21, 1926, Patent No. 1,600,891.

With the above general objects in view and others that will appear as the nature of the invention is better understood, the same consists in the novel construction, combination and arrangement of parts hereinafter more fully described, illustrated in the accompanying drawing and pointed out in the appended claims.

In the drawing forming a part of this application and in which like designating characters refer to corresponding parts throughout the several views, Fig. 1 is a cross-sectional view on horizontal plane of the cage looking downwardly;

Figure 2:
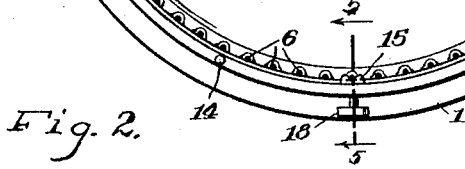
Fig. 2 is a side elevation of the bird cage.

Referring to the drawing in detail, the base of my cage is preferably an integral, sheet metal stamping, or a metal casting, the dished or concave top portion 5 of which forms the floor of my cage, and which is supported and spaced from an object (such as a table, not shown) upon which the cage may be placed by an annular flange 1. The flange 1 is of decorative appearance as shown in Figure 2. Between the top portion 5 and flange 1 is a hollow up-standing rim member 2, which is substantially U-shaped in cross-section, and provides an interior channel 3, and a shoulder 4. The rim rises considerably above the shoulder, and the shoulder is contiguous with both the edge of the top portion 5 and inner wall of the rim. It will be understood that all of the foregoing elements of construction of the base are integral with each other as shown.

The cage is made of a plurality of wire strands 6 held in position by upper band 7 and lower band 8 wherein the wires are frictionally held within loops 9 which are struck out in said bands.

Figure 5:
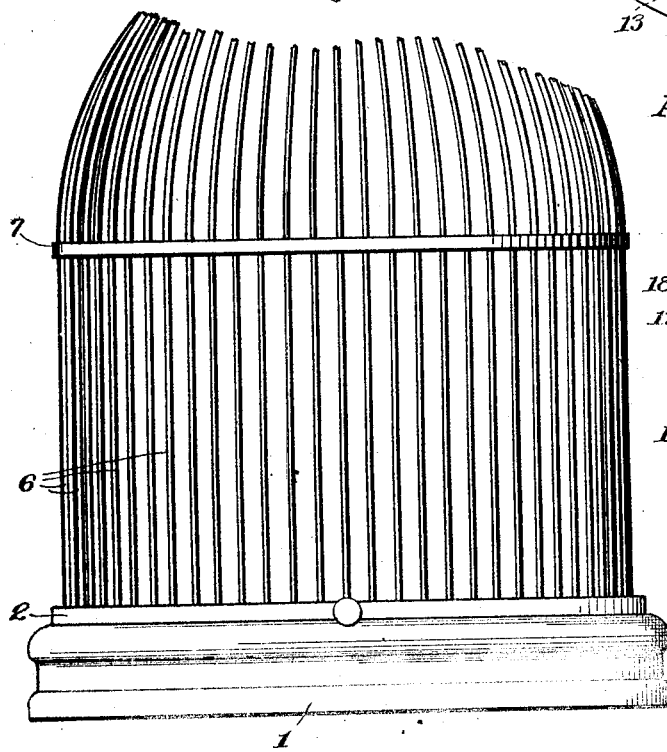
Fig. 5 is an enlarged sectional view taken on line 5—5 of Fig. 1.
Figure 5:
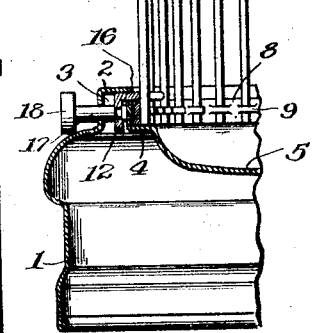

As seen on Fig. 5 the lower band 8 is receivable within the rim 2 of the base and in its operative association with the base the outer face thereof contacts with the inner wall of the rim 2, while the lower edge of said band and the lower ends of wires 6 are adapted to rest upon shoulder 4 of the base.

Figure 1:
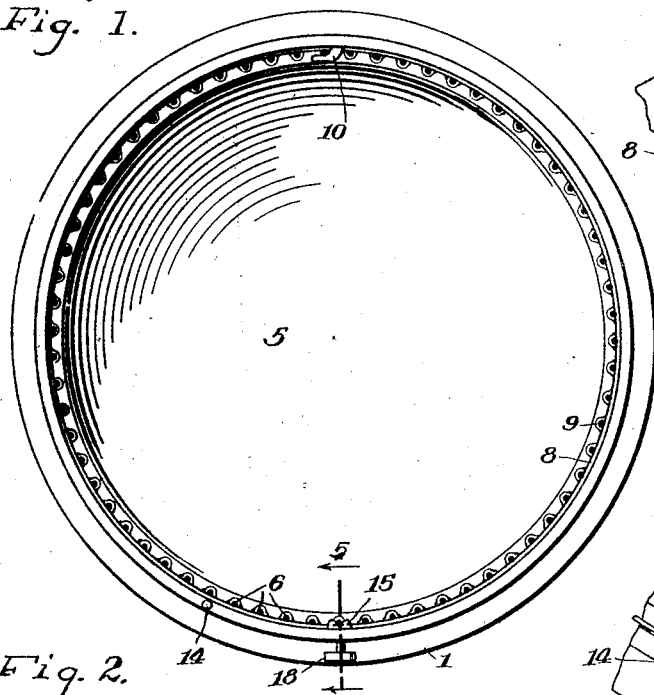
Figure 3:
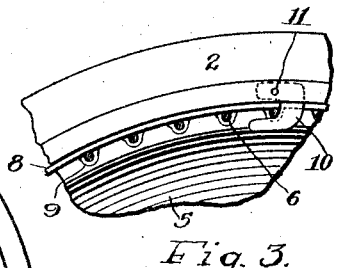
Fig. 3 is an enlarged view illustrating one of the locking means between the dome of the cage and the base thereof.

One of the locking means for the cage with the base constitutes a U-shaped tongue 10, a portion whereof is concealed within channel 3 wherein it is either soldered or by rivet 11 secured to the horizontal wall of rim 2, as clearly seen on Fig. 3. The other outer portion of said U-shaped tongue 10 projects beyond the inner upright wall of rim 2 and overhangs shoulder 4 of the base. The outwardly projecting portion of said tongue 10 is adapted to engage one of the wire strands 6. Said projecting portion of said tongue 10 further limits the upward movement of lower band 8, which in its operative position will remain below the plane of said projecting portion of tongue 10.

Figure 4:
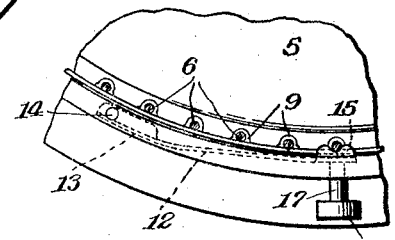
Fig. 4 is an enlarged view of the other locking means.

On a line substantially diametrically opposite from said tongue 10 rim 2 is provided with an oblong plate 12 remaining and concealed within channel 3. Said plate 12 remains in an upright position within said channel 3, and at one of its ends has an integrally formed horizontal flange portion 13 which is riveted or otherwise secured to the horizontal top wall of rim 2 as at 14. The other end of said plate 12 is provided with an M-shaped extension or flange 15 which normally projects through slot 16 provided at the upper end of inner wall of rim 2 adjacent the horizontal top wall thereof. Said plate 12 is made of springy resilient material, so that its free end, which carries extension 15 has a tendency to press toward the center, so that normally said extension 15 remains within slot 16 and projects beyond the inner upright wall of rim 2. Operating pin 17 having handle 18 is secured to said plate 12, for the purpose of retracting the free end of plate 12 for bringing flange 15 out of engagement with the cage proper when it is desired to disconnect said cage from the base. Normally said flange 15 engages one of the wire strands 6 of the cage, and remaining over band 8 prevents the upward movement of the cage in respect to the base, as clearly seen on Figs. 4 and 5.

From the hereinabove description it will be apparent that the two locking means prevent the cage from making rotary movement in respect to the base and also from becoming disengaged from the base.

While there is described herein a preferred embodiment of the present invention, it is nevertheless to be understood that minor changes may be made therein, without departing from the spirit and scope of the invention as claimed.

What I claim as new is:

1. A bird cage, comprising a separable cage body and a base, said cage body having a band at its lower extremity, said base being of integral construction and formed with a top providing a floor for the cage, a hollow rim formed on the base, a shoulder between the rim and the top of the base upon which the band is adapted to be seated, and a plurality of catches for engaging the band of the cage body to retain the cage body on the base, said catches having appreciable portions thereof retained and wholly concealed within the hollow rim, and lying below said rim at their points of engagement with the band of the cage body.

2. A bird cage, comprising a separable cage body and a base, said cage body having a band at its lower extremity, said base being of integral construction and formed with a top providing a floor for the cage, a hollow rim formed on the base, a shoulder between the rim and the top of the base upon which the band is adapted to be seated, a supporting flange contiguous with the rim and on the opposite side thereof from the shoulder, and a plurality of catches for engaging the band of the cage body to retain the cage body on the base, said catches having appreciable portions thereof retained and wholly concealed within the hollow rim, and lying below the said rim at their points of engagement with the band of the cage body.

3. A bird cage comprising a separable cage body and a base, the base being of integral construction and formed with a top constituting a floor for the cage, a shoulder contiguous with the top and upon which the cage is adapted to be seated, a hollow rim having a U-shaped configuration in cross section and contiguous with the shoulder and rising thereabove, a flange contiguous with the rim and on the opposite side thereof from the shoulder and adapted to support the base, and a plurality of catches for retaining the cage on the shoulder, the portions of said catches engaging said cage lying below the top of the rim, and the remaining portions of said catches being retained and concealed wholly within the hollow interior of the rim for the purpose defined.

In testimony whereof I affix my signature.

ANTON M. KROCZEK.